US006667274B1

(12) United States Patent
Hawley et al.

(10) Patent No.: US 6,667,274 B1
(45) Date of Patent: Dec. 23, 2003

(54) POLYMERIZATION CATALYSTS

(75) Inventors: Gil R. Hawley, Dewey, OK (US); Max P. McDaniel, Bartlesville, OK (US); Christopher E. Wittner, Bartlesville, OK (US); Michael D. Jensen, Bartlesville, OK (US); Joel L. Martin, Bartlesville, OK (US); Elizabeth A. Benham, Bartlesville, OK (US); Anthony P. Eaton, Sugar Land, TX (US); Kathy S. Collins, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 515 days.

(21) Appl. No.: 09/639,836

(22) Filed: Aug. 16, 2000

Related U.S. Application Data

(60) Provisional application No. 60/174,044, filed on Dec. 30, 1999.

(51) Int. Cl.[7] .................................................. B01J 20/08

(52) U.S. Cl. ..................... 502/415; 502/152; 502/104; 502/102; 502/103; 502/117; 502/118; 502/119; 502/132; 526/160; 526/943; 526/348; 526/130; 526/154; 526/129

(58) Field of Search ................................ 502/415, 152, 502/104, 102, 103, 117, 118, 119, 132; 526/160, 943, 348, 130, 154, 129

(56) References Cited

U.S. PATENT DOCUMENTS

| 5,561,092 A |   | 10/1996 | Ewen et al. ............... 502/117 |
| 5,756,609 A |   | 5/1998 | Cohen ........................ 526/127 |
| 5,763,549 A |   | 6/1998 | Elder et al. ............... 526/153 |
| 5,792,819 A |   | 8/1998 | Erker et al. ............... 522/134 |
| 6,107,230 A | * | 8/2000 | McDaniel et al. .......... 502/104 |

* cited by examiner

*Primary Examiner*—Ling-Siu Choi
(74) *Attorney, Agent, or Firm*—Kilpatrick Stockton LLP

(57) ABSTRACT

A process to produce a polymer is provided. The process comprising contacting a treated solid oxide compound, an organometal compound, and an organoaluminum compound in the presence of an alpha olefin under polymerization conditions to produce the polymer.

10 Claims, No Drawings

POLYMERIZATION CATALYSTS

This application claims the benefit of U.S. Provisional Application No. 60/174,044, filed Dec. 30$^{th}$, 1999.

FIELD OF THE INVENTION

This invention is related to the field of catalyst compositions that can be used to polymerize at least one alpha olefin to produce a polymer.

BACKGROUND OF THE INVENTION

The production of polymers is a multi-billion dollar business. This business produces billions of pounds of polymers each year. Millions of dollars have been spent on developing technologies that can add value to this business.

One of these technologies is called metallocene catalyst technology. Metallocene catalysts have been known since about 1958. However, their low productivity did not allow them to be commercialized. About 1974, it was discovered that contacting one part water with one part trimethylaluminum to form methyl aluminoxane, and then contacting such methyl aluminoxane with a metallocene compound, formed a metallocene catalyst that had greater activity. However, it was soon realized that large amounts of expensive methyl aluminoxane were needed to form an active metallocene catalyst. This has been a significant impediment to the commercialization of metallocene catalysts.

Fluoro organic borate compounds have been used in place of large amounts of methyl aluminoxane. However, this is not satisfactory, since borate compounds are very sensitive to poisons and decomposition, and can also be very expensive.

It should also be noted that having a heterogeneous catalyst is important. This is because heterogeneous catalysts are required for most modern commercial polymerization processes; Furthermore, heterogeneous catalysts can lead to the formation of substantially uniform polymer particles that have a high bulk density. These types of substantially uniform particles are desirable because they improve the efficiency of polymer production and transportation. Efforts have been made to produce heterogeneous metallocene catalysts; however, these catalysts have not been entirely satisfactory.

An object of this invention is to provide a process for producing a catalyst precursor for use in a catalyst composition.

Another object is to provide the catalyst precursor.

Another object of this invention is to provide a process for producing the catalyst composition.

Another object of this invention is to provide the catalyst composition.

Another object of this invention is to provide a process of using the catalyst composition to polymerize at least one alpha olefin to produce a polymer.

Another object of this invention is to provide the polymer produced by the catalyst composition.

These objects, and other objects, will become more apparent to those with ordinary skill in the art after reading this disclosure.

SUMMARY OF THE INVENTION

In accordance with one embodiment of this invention, a process to produce a catalyst precursor is provided. The process consists essentially of contacting at least one treated solid oxide compound and at least one alpha olefin;

wherein the treated solid oxide compound is produced by a process comprising: a) contacting at least one solid oxide compound with at least one electron-withdrawing anion source compound; b) optionally, also contacting the solid oxide compound with at least one metal salt compound; and c) calcining the solid oxide compound before, during, or after contacting the electron-withdrawing anion source compound or the metal salt compound to produce the treated solid oxide compound.

In accordance with another embodiment of this invention, the catalyst precursor is provided.

In accordance with another embodiment of this invention, a process for producing a catalyst composition is provided. The process comprises:

1) contacting the catalyst precursor with at least one organometal compound and at least one organoaluminum compound to produce the catalyst composition;

wherein the organometal compound has the following general formula:

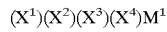

$(X^1)(X^2)(X^3)(X^4)M^1$ wherein $M^1$ is selected from the group consisting of titanium, zirconium, and hafnium;

wherein $(X^1)$ and $(X^2)$ are independently selected from the group consisting of cyclopentadienyls, indenyls, fluorenyls, substituted cyclopentadienyls, substituted indenyls, and substituted fluorenyls;

wherein substituents on the substituted cyclopentadienyls, substituted indenyls, and substituted fluorenyls of $(X^1)$ and $(X^2)$ are selected from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen;

wherein at least one substituent on $(X^1)$ and $(X^2)$ is a bridging group which connects $(X^1)$ and $(X^2)$;

wherein $(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups; and wherein the organoaluminum compound has the following general formula:

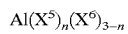

$Al(X^5)_n(X^6)_{3-n}$ wherein $(X^5)$ is a hydrocarbyl having from 1–20 carbon atoms;

wherein $(X^6)$ is a halide, hydride, or alkoxide;

wherein "n" is a number from 1 to 3 inclusive.

In accordance with another embodiment of this invention, a process is provided to produce a catalyst composition. The process comprising simultaneously contacting at least one treated solid oxide compound, at least one organometal compound, at least one organaluminum compound, and at least one alpha olefin to produce the catalyst composition.

In accordance with another embodiment of this invention, a process is provided to produce a polymer. The process comprises contacting the catalyst composition with at least one additional alpha olefin in a polymerization zone under polymerization conditions to produce the polymer.

In accordance with another embodiment of this invention, a process is provided to produce a polymer. The process comprises simultaneously contacting an organometal compound, an organoaluminum compound, a treated solid oxide compound and at least one alpha olefin under polymerization conditions to produce a polymer. The organometal compound, the organoaluminum compound and the treated solid oxide compound are as described in the previous embodiment.

In accordance with another embodiment of this invention, a polymer is provided.

DETAILED DESCRIPTION OF THE INVENTION

In a first embodiment of this invention, a process to produce a catalyst precursor is provided. The process consists essentially of contacting at least one treated solid oxide compound and at least one alpha olefin.

Treated solid oxide compounds are compounds that have had their Lewis acidity increased. The treated solid oxide compound can be produced by a process comprising contacting at least one solid oxide compound with at least one electron-withdrawing anion source to form an anion-containing solid oxide compound. The solid oxide compound is calcined either prior to, during, or after contacting with the electron-withdrawing anion source. Calcining is discussed later in this disclosure.

Generally, the specific surface area of the solid oxide compound after calcining at 500° C. is from about 100 to about 1000 $m^2/g$, preferably, from about 200 to about 800 $m^2/g$, and most preferably, from 250 to 600 $m^2/g$.

The specific pore volume of the solid oxide compound is typically greater than about 0.5 cc/g, preferably, greater than about 0.8 cc/g, and most preferably, greater than 1.0 cc/g.

It is preferred when the treated solid oxide compound comprises oxygen and at least one element selected from the group consisting of groups IIA–VIIIA and IB–VIIB of the Periodic Table of Elements, including lanthanides and actinides. However, it is preferred when the element is selected from the group consisting of Al, B, Be, Bi, Cd, Co, Cr, Cu, Fe, Ga, La, Mn, Mo, Ni, Sb, Si, Sn, Sr, Th, Ti, V, W, P, Y, Zn and Zr. It is important that these treated solid oxide compounds have electron withdrawing ability, while not wanting to be bound by theory, it is believed that a treated solid oxide compound should have a higher Lewis acidity compared to the untreated solid oxide compound. However, it is hard to accurately measure the Lewis acidity of these treated, and untreated solid oxide compounds so various methods have been used. Currently, comparing the activities of treated, and untreated solid oxide compounds under acid catalyzed reactions is preferred.

Treated solid oxide compounds can be produced in a variety of ways, such as, for example, by gelling, co-gelling, or impregnation of one compound onto another.

In general, it is preferred to contact at least one solid oxide compound, such as, for example, alumina, zirconia, titania, and mixtures thereof, such as, for example, silica-alumina, with at least one electron-withdrawing anion source compound, to form an anion-containing solid oxide compound, followed by calcining the anion-containing solid oxide compound to form a treated solid oxide compound. In the alternative, a solid oxide compound and an electron-withdrawing anion source compound can be contacted and calcined simultaneously.

The electron-withdrawing anion source compound is any compound that increases the Lewis acidity of the solid oxide under the conditions given herein for producing the treated solid oxide compound. These electron-withdrawing anion source compounds increase the Lewis acidity of the solid oxide compound by contributing to the formation of an electron withdrawing anion, such as, for example, sulfates, halides, and triflate. It should be noted that one or more different electron withdrawing anion source compounds can be used.

The acidity of the solid oxide compound can be further enhanced by using two, or more, electron-withdrawing anion source compounds in two, or more, separate contacting steps. An example of such a process is contacting at least one solid oxide compound with a first electron-withdrawing anion source compound to form a first anion-containing solid oxide compound, followed by calcining the first anion-containing solid oxide compound, followed by contacting with a second electron-withdrawing anion source compound to form a second anion-containing solid oxide compound, followed by calcining the second anion-containing solid oxide compound to form a treated solid oxide compound. It should be noted that the first and second electron-withdrawing anion source compounds can be the same, but are preferably different.

Suitable examples of solid oxide compounds include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$: and mixtures thereof, such as, for example, silica-alumina and silica-zirconia. It should be noted that solid oxide compounds that comprise Al—O bonds are currently preferred.

Before, during or after calcining, the solid oxide compound can be contacted with an electron-withdrawing anion source compound. The electron-withdrawing anion source compound can be selected from the group consisting of at least one halogen-containing compound, sulfate-containing compound, or triflate-containing compound. The halogen-containing compound is selected from the group consisting of chlorine-containing compounds, bromine-containing compounds, and fluorine-containing compounds. The halogen-containing compound can be in a liquid phase, or preferably, a vapor phase. Optionally, the solid oxide compound can be calcined at about 100 to about 900° C. before being contacted with the halogen-containing compound.

Any method known in the art of contacting the solid oxide compound with the fluorine-containing compound can be used in this invention. A common method is to impregnate the solid oxide compound with an aqueous solution of a fluoride-containing salt before calcining, such as ammonium fluoride [$NH_4F$], ammonium bifluoride [$NH_4HF_2$], hydrofluoric acid [HF], ammonium silicofluoride [$(NH_4)_2SiF_6$], ammonium fluoroborate [$NH_4BF_4$], ammonium fluorophosphate [$NH_4PF_6$], and mixtures thereof.

In a second method, the fluorine-containing compound can be dissolved into an organic compound, such as an alcohol, and added to the solid oxide compound to minimize shrinkage of pores during drying. Drying can be accomplished by any method known in the art, such as, for example, vacuum drying, spray drying, flashing drying, and the like.

In a third method, the fluorine-containing compound can be added during the calcining step. In this technique, the fluorine-containing compound is vaporized into the gas stream used to fluidize the solid oxide compound so that it is fluorided from the gas phase. In addition to some of the fluorine-containing compounds described previously, volatile organic fluorides may be used at temperatures above their decomposition points, or at temperatures high enough to cause reaction. For example, perfluorohexane, perfluorobenzene, trifluoroacetic acid, trifluoroacetic anhydride, hexafluoroacetylacetonate, and mixtures thereof can be vaporized and contacted with the solid oxide compound at about 300 to about 600° C. in air or nitrogen. Inorganic fluorine-containing compounds can also be used, such as hydrogen fluoride or even elemental fluorine.

Generally, the amount of fluorine present is about 2 to about 50 weight percent fluorine based on the weight of the treated solid oxide compound before calcining or the amount added to a precalcined solid oxide compound. Preferably, it is about 3 to about 25 weight percent, and most preferably, it is 4 to 20 weight percent fluorine based on the weight of the treated solid oxide compound before calcining or the amount added to a precalcined solid oxide compound.

Any method known in the art of contacting the solid oxide compound with the chlorine-containing compound or bromine-containing compound can be used in this invention. Generally, the contacting is conducted during or after calcining, preferably during calcining. Any suitable chlorine-containing containing compound or bromine-containing compound that can deposit chlorine or bromine or both on the solid oxide compound can be used. Suitable chlorine-containing containing compounds and bromine-containing compound include volatile or liquid organic chloride or bromide compounds and inorganic chloride or bromide compounds. Organic chloride or bromide compounds can be selected from the group consisting of carbon tetrachloride, chloroform, dichloroethane, hexachlorobenzene, trichloroacetic acid, bromoform, dibromomethane, perbromopropane, phosgene, and mixtures thereof. Inorganic chloride or bromide compounds can be selected from the group consisting of gaseous hydrogen chloride, silicon tetrachloride, tin tetrachloride, titanium tetrachloride, aluminum trichloride, boron trichloride, thionyl chloride, sulfuryl chloride, hydrogen bromide, boron tribromide, silicon tetrabromide, and mixtures thereof. Additionally, chlorine and bromine gas can be used.

If an inorganic chlorine-containing compound or bromine-containing compound is used, such as titanium tetrachloride, aluminum trichloride, or boron trichloride, it also can be possible to contact the chlorine-containing compound or bromine-containing compound with the solid oxide compound after calcining, either by vapor phase deposition or even by using an anhydrous solvent.

Generally, the amount of chlorine or bromine used is from about 0.01 to about 10 times the weight of the treated solid oxide compound before calcining or the amount added to a precalcined solid oxide compound, preferably it is from about 0.05 to about 5 times, most preferably from 0.05 to 1 time the weight of the treated solid oxide compound before calcining or the amount added to a precalcined solid oxide compound.

The treated solid oxide compound also can be produced by a process comprising contacting at least one solid oxide compound with at least one electron-withdrawing anion source and at least one metal salt compound. In general, it is preferred to contact at least one solid oxide compound, such as, for example, alumina, zirconia, titania, and mixtures thereof, or with mixtures of other solid oxide compounds such as, for example, silica-alumina, with at least one metal salt compound and at least one electron-withdrawing anion source compound, to form an anion- and metal-containing solid oxide compound. The anion- and metal-containing solid oxide compound then is calcined to form a treated solid oxide compound. In the alternative, a solid oxide compound, a metal salt compound, and an electron-withdrawing anion source compound can be contacted and calcined simultaneously. In another alternative, the metal salt compound and the electron-withdrawing anion source compound can be the same compound.

The metal salt compound is any compound that increases the Lewis acidity of the solid oxide compound under the conditions given herein for producing the treated solid oxide compound. It is preferred when the metal in the metal salt is selected from the group consisting of groups IIA–VIIIA and IB–VIIB of the Periodic Table of Elements, including lanthanides and actinides. However, it is most preferred when the element is selected from the group consisting of Al, B, Be, Bi, Cd, Co, Cr, Cu, Fe, Ga, La, Mn, Mo, Ni, Sb, Si, Sn, Sr, Th, Ti, V, W, P, Y, Zn and Zr.

To produce the treated solid oxide compound, at least one metal salt compound can be contacted with the solid oxide compound by any means known in the art to produce a metal-containing solid oxide compound. The metal salt compound can be added to the solid oxide compound before calcining, during calcining, or in a separate step after calcining the solid oxide compound.

Generally, the solid oxide compound is contacted with an aqueous or organic solution of the metal salt compound before calcining. For example, the metal can be added to the solid oxide compound by forming a slurry of the solid oxide compound in a solution of the metal salt compound and a suitable solvent such as alcohol or water. Particularly suitable are one to three carbon atom alcohols because of their volatility and low surface tension. A suitable amount of the solution is utilized to provide the desired concentration of metal after drying. Any water soluble or organic soluble metal salt compound is suitable that can impregnate the solid oxide compound with metal. Drying can be completed by suction filtration followed by evaporation, vacuum drying, spray drying, or flash drying.

If the metal is added to the solid oxide compound after calcination, one preferred method is to impregnate the solid oxide compound with a hydrocarbon solution of the metal salt compound.

Generally, the amount of metal present in the metal-containing solid oxide compound is in a range of about 0.1 to about 30 weight percent metal where the weight percent is based on the weight of the metal-containing solid oxide compound before calcining or the amount added to a precalcined solid oxide compound. Preferably, the amount of metal present in the metal-containing solid oxide compound is in a range of about 0.5 to about 20 weight percent metal based on the weight of the metal-containing solid oxide compound before calcining or the amount added to a precalcined solid oxide compound. Most preferably, the amount of metal present in the metal-containing solid oxide compound is in a range of 1 to 10 weight percent metal based on the weight of the metal-containing solid oxide compound before calcining or the amount added to a precalcined solid oxide compound.

The metal-containing solid oxide compound then can be contacted with at least one electron-withdrawing anion source compound by the methods discussed previously in this disclosure.

Before, during, or after the solid oxide compound is combined with the metal salt compound or the electron-withdrawing anion source compound, it is calcined for about 1 minute to about 100 hours, preferably from about 1 hour to about 50 hours, and most preferably, from 3 to 20 hours. Generally, the calcining is conducted at a temperature in a range of about 200° C. to about 900° C., preferably from about 300° C. to about 700° C., and most preferably, from 350° C. to 600° C. The calcining can be conducted in any suitable atmosphere. Generally, the calcining can be completed in an inert atmosphere. Alternatively, the calcining can be completed in an oxidizing atmosphere, such as, oxygen or air, or a reducing atmosphere, such as, hydrogen or carbon monoxide.

Any alpha olefin can be contacted with the treated solid oxide compound. Exemplary alpha olefins include, but are not limited to, propylene and 1-butene. Preferably, the alpha olefin is propylene.

In a second embodiment of this invention, a process is provided to produce a catalyst composition. The process comprises contacting the catalyst precursor, at least one organometal compound, and at least one organoaluminum compound to produce the catalyst composition.

Organometal compounds used in this invention have the following general formula:

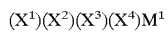

In this formula, $M^1$ is selected from the group consisting of titanium, zirconium, and hafnium. Currently, it is most preferred when $M^1$ is zirconium.

In this formula, $(X^1)$ and $(X^2)$ are independently selected from the group consisting of cyclopentadienyls, indenyls, fluorenyls, substituted cyclopentadienyls, substituted indenyls, such as, for example, tetrahydroindenyls, and substituted fluorenyls, such as, for example, octahydrofluorenyls.

Substituents on the substituted cyclopentadienyls, substituted indenyls, and substituted fluorenyls of $(X^1)$ and $(X^2)$ can be selected independently from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen, as long as these groups do not substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Substituted silyl groups include, but are not limited to, alkylsilyl groups where each alkyl group contains from 1 to about 12 carbon atoms, arylsilyl groups, and arylalkylsilyl groups. Suitable alkyl halide groups have alkyl groups with 1 to about 12 carbon atoms. Suitable organometallic groups include, but are not limited to, substituted silyl derivatives, substituted tin groups, substituted germanium groups, and substituted boron groups.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, iodo, trimethylsilyl, and phenyloctylsilyl.

The organometal compound must have at least one substituent on $(X^1)$ and $(X^2)$ which serves as a bridging group which connects $(X^1)$ and $(X^2)$. This bridging group consists of one, two, or three connecting atoms which also can have substituents selected from the group consisting of aliphatic groups, cyclic groups, combinations of aliphatic and cyclic groups, silyl groups, alkyl halide groups, halides, and organometallic groups as long as the bridging group does not substantially, and adversely, affect the activity of the catalyst composition. The connecting atoms are selected from the group of carbon, silicon, germanium, tin, nitrogen, phosphorous or boron, and combinations thereof. Suitable bridging groups include, but are not limited to, aliphatic groups, cyclic groups, combinations of aliphatic groups and cyclic groups, phosphorous groups, nitrogen groups, organometallic groups, silicon, phosphorus, boron, and germanium. Suitable examples of aliphatic groups are hydrocarbyls, such as, for example, paraffins and olefins. Suitable examples of cyclic groups are cycloparaffins, cycloolefins, cycloacetylenes, and arenes. Suitable organometallic groups include, but are not limited to, substituted silyl derivatives, substituted tin groups, substituted germanium groups, and substituted boron groups. Examples of particularly preferred bridging groups include dimethylsilyl, isopropylidenyl, 1,2 ethylidenyl, diphenyl germanium, and the like.

In this formula, $(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups, as long as these groups do not substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Currently, it is preferred when $(X^3)$ and $(X^4)$ are selected from the group consisting of halides and hydrocarbyls, where such hydrocarbyls have from 1 to about 10 carbon atoms. However, it is most preferred when $(X^3)$ and $(X^4)$ are selected from the group consisting of fluoro, chloro, and methyl.

Various processes are known to make these organometal compounds. See, for example, U.S. Pat. Nos. 4,939,217; 5,210,352; 5,436,305; 5,401,817; 5,631,335, 5,571,880;

5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579; and 5,668,230; the entire disclosures of which are hereby incorporated by reference.

Specific examples of such organometal compounds are as follows:

1,2-ethanediylbis($\eta^5$-1-indenyl)di-n-butoxyhafnium;

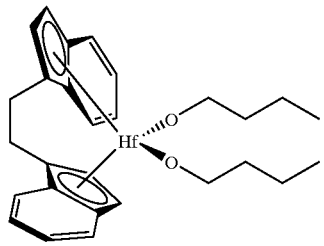

1,2-ethanediylbis($\eta^5$-1-indenyl)dimethylzirconium;

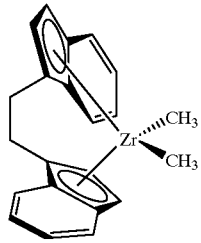

3,3-pentanediylbis($\eta^5$-4,5,6,7-tetrahydro-1-indenyl) hafnium dichloride;

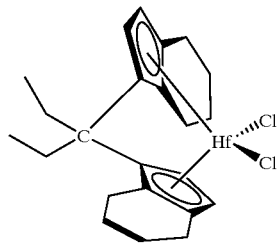

methylphenylsilylbis($\eta^5$-4,5,6,7-tetrahydro-1-indenyl) zirconium dichloride;

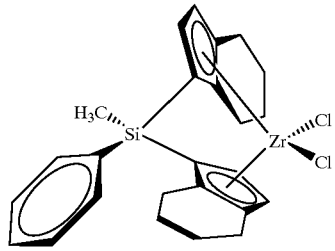

dimethylsilylbis(1-indenyl)zirconium dichloride;

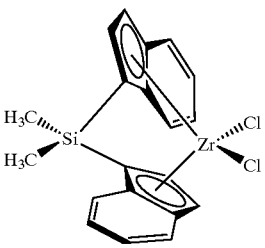

octylphenylsilylbis(1-indenyl)hafnium dichlonrde;

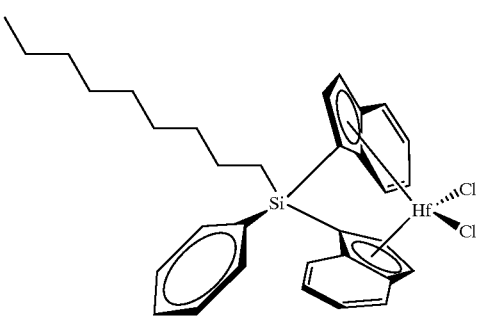

dimethylsilylbis($\eta^5$-4,5,6,7-tetrahydro-1-indenyl) zirconium dichloride;

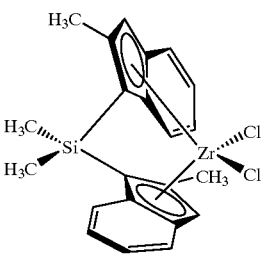

dimethylsilylbis(2-methyl-1-indenyl)zirconium dichloride;

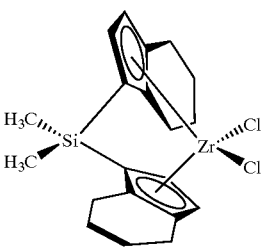

1,2-ethanediylbis(9-fluorenyl)zirconium dichloride; and

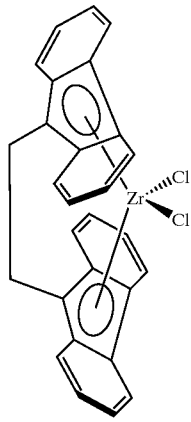

methyloctylsilyl bis (9-fluorenyl) zirconium dichloride;

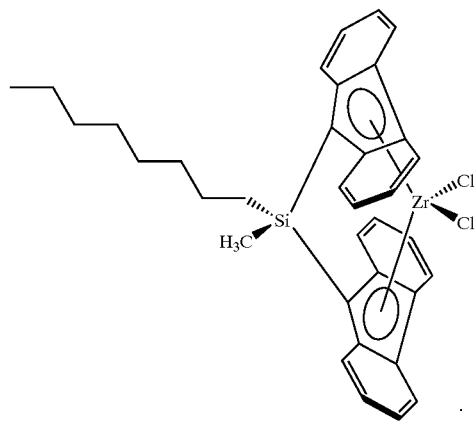

Preferably, the organometal compound is selected from the group consisting of:

dimethylsilylbis(1-indenyl) zirconium dichloride;

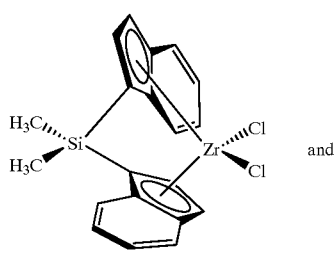

and dimethylsilylbis(2-methyl-1-indenyl)zirconium dichloride;

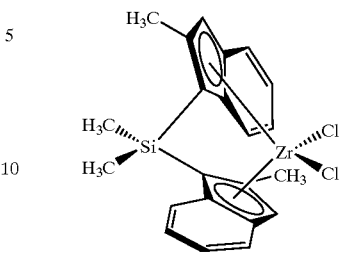

Organoaluminum compounds have the following general formula:

$$Al(X^5)_n(X^6)_{3-n}$$

In this formula, $(X^5)$ is a hydrocarbyl having from 1 to about 20 carbon atoms. Currently, it is preferred when $(X^5)$ is an alkyl having from 1 to about 10 carbon atoms. However, it is most preferred when $(X^5)$ is selected from the group consisting of methyl, ethyl, propyl, butyl, and isobutyl.

In this formula, $(X^6)$ can be an alkyl having from 1 to about 10 carbon atoms, or a halide, hydride, or alkoxide. Currently, it is preferred when $(X^5)$ and $(X^6)$ are the same.

In this formula, "n" is a number from 1 to 3 inclusive. However, it is preferred when "n" is 3.

Examples of such compounds are as follows:

trimethylaluminum;

triethylaluminum (TEA);

tripropylaluminum;

diethylaluminum ethoxide;

tributylaluminum;

diIsobutylaluminum hydride;

triisobutylaluminum hydride;

triisobutylaluminum; and diethylaluminum chloride.

Currently triisobutyl aluminum is preferred.

The catalyst compositions of this invention also can be produced by contacting at least one organometal compound, at least one treated solid oxide compound, at least one organoaluminum compound, and at least one alpha olefin together. The method of contacting these catalyst components is important in establishing polymerization activity. It is most important that an alpha olefin, preferably propylene, be used early in the contacting of the organometal compound, the treated solid oxide compound, and the organoaluminum compound.

One preferred method of contacting is for the treated solid oxide compound to be contacted with the alpha olefin first to produce a catalyst precursor, then to be contacted by the organometal compound and organoaluminum compound. In this method, the organometal compound can also be pre-contacted with the organoaluminum compound before being allowed to react with the catalyst precursor.

A second preferred method of contacting is to substantially simultaneously contact the organometal compound, the organoaluminum compound, the treated solid oxide compound, and the alpha olefin. In this method, then, the organometal compound, the organoaluminum compound and the treated solid oxide compound contact the alpha olefin before substantially contacting each other.

A weight ratio of the organoaluminum compound to the treated solid oxide compound in the catalyst composition ranges from about 5:1 to about 1:1000, preferably, from about 3:1 to about 1:100, and most preferably, from 1:1 to 1:50.

A weight ratio of the treated solid oxide compound to the organometal compound in the catalyst composition ranges from about 10,000:1 to about 1:1, preferably, from about 1000:1 to about 10:1, and most preferably, from 250:1 to 20:1. These ratios are based on the amount of the components combined to give the catalyst composition.

After contacting, the catalyst composition comprises a post-contacted organometal compound, a post-contacted organoaluminum compound, and a post-contacted treated solid oxide compound. Preferably, the post-contacted treated solid oxide compound is the majority, by weight, of the catalyst composition. Often times, specific components of a catalyst are not known, therefore, for this invention, the catalyst composition is described as comprising post-contacted compounds.

A weight ratio of the post-contacted organoaluminum compound to the post-contacted treated solid oxide compound in the catalyst composition ranges from about 5:1 to about 1:1000, preferably, from about 3:1 to about 1:100, and most preferably, from 1:1 to 1:50.

A weight ratio of the post-contacted treated solid oxide compound to the post-contacted organometal compound in the catalyst composition ranges from about 10,000:1 to about 1:1, preferably, from about 1000:1 to about 10:1, and most preferably, from 250:1 to 20:1. These ratios are based on the amount of the components combined to give the catalyst composition.

The activity of the catalyst composition is greater than 100 grams of polypropylene per gram of treated solid oxide compound per hour, preferably greater than 250, even more preferably greater than 500, and most preferably greater than 1000. This activity is measured under bulk slurry polymerization conditions, using liquid propylene as both the diluent and alpha olefin, and with a polymerization temperature of 70° C. The reactor should have substantially no indication of any wall scale, coating or other forms of fouling.

These catalyst compositions are often sensitive to hydrogen and can incorporate comonomers well. Usually these catalyst compositions produce polymers with a narrow molecular weight distribution.

One of the important aspects of this invention is that no aluminoxane needs to be used in order to form the catalyst composition. Aluminoxane is an expensive compound that greatly increases polymer production costs. This also means that no water is needed to help form such aluminoxanes. This is beneficial because water can sometimes kill a polymerization process. Additionally, it should be noted that no fluoro organic borate compounds need to be used in order to form the catalyst composition. In summary, this means that the catalyst composition, which is heterogenous, and which can be used for polymerizing monomers, can be easily and inexpensively produced because of the substantial absence of any aluminoxane compounds or fluoro organic borate compounds. It should be noted that organochromium compounds and $MgCl_2$ are not needed in order to form the catalyst composition. Although aluminoxane, fluoro organic borate compounds, organochromium compounds, or $MgCl_2$ are not needed in the preferred embodiments, these compounds can be used in other embodiments of this invention.

The catalyst compositions of this invention can be utilized in a polymerization process to produce a polymer. The polymerization process comprises contacting the catalyst composition and an additional amount of alpha olefin in a polymerization zone under polymerization conditions to produce the polymer. The additional amount of alpha olefin can be the same alpha olefin or a different alpha olefin from that used to make the catalyst precursor. Alternatively, the polymer can be produced by a process comprising simultaneously contacting at least one organometal compound, at least one organoaluminum compound, at least one treated solid oxide compound, and at least one alpha olefin in a polymerization zone under polymerization conditions.

The alpha olefins useful in this invention are unsaturated hydrocarbons. The term "propylene polymer" as used in this disclosure refers to homopolymers and copolymers. Propylene is efficiently polymerized into a homopolymer. Additionally, when a copolymer is desired, it is most preferred to use propylene and ethylene as the alpha olefins. The amount of comonomer introduced into a reactor zone to produce a copolymer is generally from about 0.01 to about 10 weight percent comonomer based on the total weight of the monomer and comonomer, preferably, about 0.1 to about 5, and most preferably, 0.1 to 4. Alternatively, an amount sufficient to give the above described concentrations by weight, in the copolymer produced can be used.

Processes that can polymerize liquid propylene into polymers are known in the art, such as, for example, slurry polymerization, gas phase polymerization, and solution polymerization. It is preferred to perform a slurry polymerization in a loop reactor. Furthermore, it is even more preferred to use liquid propylene as both the diluent and alpha olefin in a slurry polymerization. Examples of such technology can be found in U.S. Pat. Nos. 4,424,341; 4,501,885; 4,613,484; 4,737,280; and 5,597,892; the entire disclosures of which are hereby incorporated by reference.

It should be noted that under slurry polymerization conditions, this process polymerizes liquid propylene alone, or liquid propylene with ethylene very well. In particular, the catalyst compositions used in this process produce good quality polymer particles without substantially fouling the reactor. When the catalyst composition is to be used in a loop reactor under slurry polymerization conditions, it is preferred when the particle size of the solid oxide compound is in the range of about 10 to about 1000 micrometers, preferably about 25 to about 500 micrometers, and most preferably, 50 to 200 micrometers, for best control during polymerization.

After the polymers are produced, they can be formed into various articles, such as, for example, household containers and utensils, drums, fuel tanks, pipes, geomembranes, and liners. Various processes can form these manufactures. Usually, additives and modifiers are added to the polymer in order to provide desired effects. By using the invention described herein, articles can be produced at a lower cost, while maintaining most, if not all, of the unique properties of polymers produced with metallocene catalysts.

EXAMPLES

These examples provide additional information to a person skilled in the art. These examples are not meant to be construed as limiting the scope of the claims.

A "Quantachrome Autosorb-6 Nitrogen Pore Size Distribution Instrument" was used to determined the surface area and pore volume of the solid oxide compounds. This instrument was acquired from the Quantachrome Corporation, Syosset, N.Y.

Bulk densities were determined in lbs/ft by weighing a 100 mL graduated cylinder in which polymer fluff had been lightly tapped.

Molecular weights and molecular weight distributions were obtained using a Waters 150 C-series gel permeation chromatograph with trichlorobenzene (TCB) as the solvent, with a flow rate of 1 mL/minute at a temperature of 140° C. BHT (2,6-di-tert-butyl-4-methylphenol) at a concentration of 0.5–1.0 g/L was used as a stabilizer in the TCB. An injection volume of 220 microliters was used with a nominal polymer concentration of 0.5–2 g/L (at room temperature). Dissolution of the sample in stabilized TCB was carried out by heating at 155–170° C. for 20 hours with occasional, gentle agitation. The column was two Waters styragel HT-6E columns (7.8×300 mm). The columns were calibrated with a broad linear polyethylene standard (Phillips Marlex® polyethylene BHB 5003) for which the molecular weight had been determined.

Isotacticity was determined by $C_{13}$NMR. The spectra were taken using standard accepted spectroscopy techniques. The polymer was dissolved in trichlorobenzene, and the spectra was taken with respect to an internal standard relative to hexamethylsiloxane which has a known reference point relative to tramethylsilane. From the observed integrals of the relevant peaks, the details regarding the microstructure of the polymer was calculated.

Calcining Procedure

To calcine a material, about 10 grams were placed in a 1.75 inch quartz tube fitted with a sintered quartz disk at the bottom. While the material was supported on the disk, dry air was blown up through the disk at the linear rate of about 1.6 to about 1.8 standard cubic feet per hour. An electric furnace around the quartz tube was then turned on, and the temperature was raised at the rate of 400° C. per hour to the indicated temperature, such as 600° C. At that temperature, the material was allowed to fluidize for three hours in the dry air. Afterward, the material was collected and stored under dry nitrogen, where it was protected from the atmosphere until ready for testing.

Preparation of Solid Oxide Compounds and Treated Solid Oxide Compounds

Solid Oxide Compound #1 (Calcined Alumina): A commercial alumina sold by AKZO Company as Ketjen grade B alumina was obtained having a pore volume of about 1.78 cc/g and a surface area of about 340 square meters per gram. About 10 grams of the alumina were placed in a 1.75 inch quartz tube, which was fitted at the bottom with a sintered quartz disk. While the alumina was supported on the disk, dry air was blown up through the disk at a rate of about 1.6 to 1.8 standard cubic feet per hour. An electric furnace around the quartz tube then was turned on, and the temperature was raised at the rate of 400° C. per hour to a temperature of 600° C. At that temperature, the alumina was allowed to fluidize for three hours in the dry air to produce a calcined alumina. Afterward, the calcined alumina was collected and stored under dry nitrogen.

Treated Solid Oxide Compound #2 (Calcined Zinc-Containing Alumina):

A solution of 40 milliliters of deionized water and 2.0 grams of zinc dichloride was made. A few drops of nitric acid were added to dissolve substantially all of the zinc. This solution then was impregnated onto a 10 gram sample of Ketjen Grade B alumina to produce a wet sand consistency. This material then was dried overnight under vacuum at 110° C. to produce a zinc-containing alumina. Thus, the zinc chloride loading was 20% by weight of the alumina. The zinc-containing alumina then was pushed through 80 mesh screen and precalcined at 550° C. in a muffle furnace. A portion of this zinc-containing alumina then was calcined in fluidizing dry air at 600° C. for three hours to convert the zinc to a mixed oxide to produce a calcined zinc-containing alumina. The calcined, zinc-containing alumina then was stored under dry nitrogen and later tested for polymerization activity.

Treated Solid Oxide Compound #3 (Chlorided. Zinc-Containing Alumina):

A solution of 40 milliliters of deionized water, 2.0 grams of zinc chloride, and 0.5 milliliter of nitric acid was made and impregnated onto a 10 gram sample of Ketjen Grade B alumina to produce a zinc-containing alumina. Thus, the zinc chloride loading was 20% by weight of the alumina. It then was dried overnight under vacuum at 110° C. and pushed through 80 mesh screen. A portion of the zinc-containing containing alumina then was calcined in dry air at 600° C. for three hours to convert the zinc to a mixed oxide to produce a calcined, zinc-containing alumina. Then, 9.62 grams of the calcined, zinc-containing alumina were heated under nitrogen to 600° C. again and while still at 600° C., 2.4 milliliters of carbon tetrachloride were injected into the gas stream ahead of the sample bed so that as the carbon tetrachloride evaporated it was carried up through the heated zinc-containing alumina bed to produce a chlorided, zinc-containing alumina. The chlorided, zinc-containing alumina then was stored under dry nitrogen and later tested for polymerization activity.

Treated Solid Oxide Compound #4 (Chlorided. Zinc-Containing Alumina)

A solution of 435 milliliters of deionized water, 34.65 grams of zinc chloride, and 2.5 milliliters of nitric acid was made and impregnated onto a 170 gram sample of Ketjen Grade B alumina to produce a zinc-containing alumina. Thus, the zinc chloride loading was 20% by weight of the alumina. The zinc-containing alumina then was dried overnight under vacuum at 110° C. and pushed through a 80 mesh screen. Then, 48.6 grams of the zinc-containing alumina were calcined in dry fluidizing air at 600° C. for three hours to convert the zinc to a mixed oxide. While still at 600° C., the gas flow was switched to nitrogen, and 2.4 milliliters of carbon tetrachloride were injected in the gas flow. The carbon tetrachloride vaporized and flowed through the zinc-containing alumina to produce a chlorided, zinc-containing alumina. The chlorided, zinc-containing alumina then was stored under dry nitrogen and later tested for polymerization activity.

Treated Solid Oxide Compound #5 (Chlorided. Zinc-Containing Alumina):

A solution of 435 milliliters of deionized water, 34.65 grams of zinc chloride, and 2.5 milliliters of nitric acid was made and impregnated onto a 170 gram sample of Ketjen Grade B alumina to produce a zinc-containing alumina. Thus, the zinc chloride loading was 20% by weight of the alumina. The zinc-containing alumina then was dried overnight under vacuum at 110° C. and pushed through a 80 mesh screen. Then, 25.96 grams of the zinc-containing alumina were calcined in dry air at 600° C. for three hours to convert the zinc to a mixed oxide. While still at 600° C., the gas flow was switched to nitrogen and 2.4 milliliters of carbon tetrachloride were injected in the gas flow. The carbon tetrachloride vaporized and flowed through the zinc-containing alumina to produce a chlorided, zinc-containing alumina. The chlorided, zinc-containing alumina then was stored under dry nitrogen and later tested for polymerization activity.

Treated Solid Oxide Compound #6 (Chlorided. Zinc-Containing Alumina):

A solution of 200 milliliters of deionized water, 20.9 grams of zinc chloride, and 1 milliliter of nitric acid was made and impregnated onto a 100 gram sample of Ketjen Grade B alumina to produce a zinc-containing alumina. Thus, the zinc chloride loading was 20% by weight of the alumina. The zinc-containing alumina then was dried overnight under vacuum at 110° C. The zinc-containing alumina then was calcined in dry air at 600° C. for three hours to convert the zinc to an oxide. 27.56 grams of the calcined, zinc-containing alumina were heated under nitrogen to 600° C. again and while still at 600° C., 3 milliliters of carbon tetrachloride were injected in the gas flow. The carbon tetrachloride vaporized and flowed through the zinc containing alumina to produce a chlorided, zinc-containing alumina. The chlorided, zinc-containing alumina then was stored under dry nitrogen and later tested for polymerization activity.

Treated Solid Oxide Compound #7:

Prepared according to the procedure used for treated solid oxide compound #6.

Treated Solid Oxide Compound #8 (Chlorided and Fluorided Alumina):

Ketjen Grade B alumina was calcined in fluidizing dry-air as described for solid oxide compound #1 at 600° C. for three hours and stored under dry nitrogen to produce a calcined alumina. Then, 20.2 grams of the calcined alumina were heated again under fluidizing nitrogen to 600° C. At this temperature, 0.8 milliliter of perfluorohexane was injected into the nitrogen flow. As it evaporated, the perfluorohexane vapors were passed up through the hot alumina bed. When all of the perfluorohexane had evaporated, 5 milliliters of carbon tetrachloride then were injected similarly. When all of the carbon tetrachloride had vaporized and flowed through the alumina to produce a fluorided and chlorided alumina, the material then was stored under dry nitrogen and later tested for polymerization activity.

Treated Solid Oxide Compound #9 (Chlorided and Fluorided Alumina):

Ketjen Grade B alumina was calcined in fluidizing dry air as described previously at 600° C. for three hours, and stored under dry nitrogen to produce a calcined alumina. Then, 6.18 grams of the calcined alumina were again heated under fluidizing nitrogen to 600° C. At this temperature, 0.24 milliliter of perfluorohexane was injected into the nitrogen flow, and after it had evaporated, it was followed by 1.55 milliliters of carbon tetrachloride. The perfluorohexane and carbon tetrachloride vaporized and flowed through the calcined alumina to produce a chlorided and fluorided alumina. The chlorided and fluorided alumina then was stored under dry nitrogen and later tested for polymerization activity.

Treated Solid Oxide Compound #10 (Chlorided. Zinc-Containing Alumina):

Solid oxide compound #2 was calcined at 600° C. and contacted with carbon tetrachloride to produce a chlorided, zinc-containing alumina.

Polymerization Procedure

Catalyst components (organometal compound, organoaluminum compound, propylene, and a solid oxide compound or treated solid oxide compound) were charged to a clean, purged polymerization reactor from vessels that were filled in an argon glove box. The reactor was a 4-liter stainless-steel autoclave reactor that was fitted with mechanical stirrer and automated temperature control. In some cases, weighed amounts of solid catalyst components were charged to the reactor through a small port in a counter-current of propylene gas. In some cases, liquid catalyst components were similarly charged through the same port using standard syringe techniques. After charging the catalyst components in this manner, the small port into the reactor was sealed with a stainless steel plug. In cases where catalyst components were added to the reactor after the addition of liquid propylene, a stainless-steel high-pressure charge apparatus, fixed to the same small entry port, was used. In these cases, both solid and liquid catalyst components were charged to the reactor from this charge apparatus under nitrogen pressure (greater than the vapor pressure of the liquid propylene). In these cases, the reactor was sealed by closing a ball valve between the reactor and the charge apparatus.

The catalyst components (including liquid propylene) were charged to the reactor in different orders and using a variety of methods. After the catalyst components specified in each example had been charged to the reactor, and the reactor was sealed, the reactor was filled $2/3$ full with liquid propylene at room temperature to produce a reaction mixture. In some examples, additional catalyst components were added after the addition of propylene. In some runs, hydrogen was also added. The temperature of the reaction mixture then was raised to the desired level by indirect heat transfer using steam heat. The reactor temperature then was maintained at this level for one hour, after which time, the polymerization reaction was terminated by venting the liquid propylene to a flare. The venting took place in a few seconds. The reactor then was opened, and the polymer removed. The polymer was dried in a vacuum oven for one hour and then weighed. Catalyst activities were determined based on the weight of the treated solid oxide compound added to the reactor. Polymer molecular weights were determined by gel permeation chromatography.

Polymerization Results

These runs demonstrate that the order of contacting the catalyst components (organometal compound, organoaluminum compound, treated solid oxide compound and propylene) affect the production of the propylene polymer. In Examples 1 through 13, liquid propylene was polymerized at 70° C. in the presence of approximately 0.01 gram of solid rac-dimethylsilylbis(1-indenyl)zirconium dichloride, 5 milliliters of a 15 wt. % solution of triethylaluminum in heptane, and approximately 0.05 to 0.1 gram of treated solid oxide compound #4 (chlorided, zinc-containing alumina). The polymerization procedure described previously was utilized. The specific charging procedures for the catalyst components used are specified in each example. The results of these runs are summarized in Table 1.

Control Example 1

First, the organometal compound was dissolved in 5 cubic centimeters (cc) of the triethylaluminum solution in a Diels-Alder tube to produce a first mixture. The first mixture then was added to the treated solid oxide compound contained in another Diels-Alder tube to produce a second mixture. About half an hour later, the second mixture was charged to the polymerization reactor through the small port. The reactor was sealed, filled $2/3$ full with liquid propylene, and 25 delta psig of hydrogen were added from a 300 cc vessel at room temperature to produce a reaction mixture. The temperature of the reaction mixture was raised to 70° C., and the polymerization reaction proceeded for one hour yielding 0.5 grams of polypropylene. This order of addition of catalyst components produced a low activity of 6.4 grams of polypropylene per gram of treated solid oxide compound #4 per hour.

Control Example 2

First, treated solid oxide compound #4 was precontacted with 5 cc of the triethylaluminum solution in a Diels Alder tube for about half an hour to produce a first mixture. Then, the solid organometal compound was charged to the reactor. Next, the first mixture was added to the reactor. The reactor was sealed and filled ⅔ full with liquid propylene to produce a reaction mixture. The temperature of the reaction mixture was raised to 70° C., and the polymerization reaction proceeded for one hour yielding 0.5 grams of polypropylene. This order of addition of catalyst components produced a low activity of 6.6 grams of polypropylene per gram of treated solid oxide compound #4 per hour.

Control Example 3

The same procedures as used in Control Example 2 were used in this example, except hydrogen was added to the reactor (25 delta psig from a 300 cc vessel at room temperature). 1.55 grams of polypropylene were produced which resulted in a low activity of 22.8 grams of polypropylene per gram of treated solid oxide compound #4 per hour.

Control Example 4

First, the organometal compound was dissolved in 10 cc of n-heptane in a Diels-Alder tube to produce a first mixture that was yellow in color. The first mixture was added to treated solid oxide compound #4 that was contained in another Diels-Alder tube to produce a second mixture. After five minutes, the treated solid oxide compound had changed color from white to purple, and the liquid phase of the second mixture became colorless. Propylene vapor was bubbled through the second mixture for an additional ten minutes. The second mixture then was charged to the polymerization reactor through the small port, followed by the addition of 5 cc of the triethylaluminum solution. The reactor was sealed, filled ⅔ full with liquid propylene, and 25 delta psig hydrogen were added (from a 300 cc vessel at room temperature) to produce a reaction mixture. The temperature of the reaction mixture then was raised to 70° C., and the polymerization reaction proceeded for one hour yielding 40 grams of polypropylene. This order of addition of catalyst components produced an activity of 465 grams of polypropylene per gram of treated solid oxide compound #4 per hour. This activity was higher than the previous control examples but remains low for commercial propylene polymerization processes.

Control Example 5

First, the organometal compound was dissolved in 10 cc of n-heptane in a Diels-Alder tube to produce a first mixture that was yellow in color. The first mixture was added to treated solid oxide compound #4 that was in a different Diels-Alder tube to produce a second mixture. After five minutes, the treated solid oxide compound had changed color from white to purple, and the liquid phase of the second mixture became colorless. The second mixture then was allowed to stand for six days, after which time the treated solid oxide compound was still purple. The second mixture was not exposed to propylene prior to charging to the reactor. The second mixture then was charged to the polymerization reactor through the small port, followed by the addition of 5 cc of the triethylaluminum solution. The reactor was sealed, filled ⅔ full with liquid propylene, and 25 delta psig hydrogen was added (from a 300 cc vessel at room temperature) to produce a reaction mixture. The temperature of the reaction mixture was raised to 70° C., and the polymerization reaction proceeded for one hour yielding 1.9 grams of polypropylene. This equates to a low activity of 21 grams of polypropylene per gram of treated solid oxide compound #4 per hour.

Control Example 6

First, organometal compound, treated solid oxide compound #4, and 8 cc of n-heptane were placed in a Diels-Alder tube to produce a first mixture. After five minutes, the treated solid oxide compound had changed color from white to purple, and the liquid phase of the first mixture became colorless as observed in Control Example 5. Propylene vapor was bubbled through the first mixture for an additional ten minutes. The first mixture then was charged to the polymerization reactor through the small port, followed by the addition of 5 cc of the triethylaluminum solution. The reactor was sealed, filled ⅔ full with liquid propylene, and 25 delta psig hydrogen were added (from a 300 cc vessel at room temperature) to produce a reaction mixture. The temperature of this reaction mixture was raised to 70° C., and the polymerization reaction proceeded for one hour yielding 14.2 grams of polypropylene. This equates to a low activity of 145 grams of polymer per gram of treated solid oxide compound #4 per hour.

Control Example 7

The same procedures as used in Control Example 6 were used in this example, except propylene vapor was not bubbled through the first mixture. 60.8 grams of polypropylene were produced which resulted in a low activity of 553 grams of polypropylene per gram of treated solid oxide compound #4 per hour.

Control Example 8

First, under an argon atmosphere, the organometal compound, treated solid oxide compound #4, and 5 cc of n-heptane were mixed in a small glass vial to produce a first mixture. After five minutes, treated solid oxide compound #4 had changed color from white to purple, and the liquid phase of the first mixture became colorless as observed in Control Example 5. The first mixture was transferred to the stainless-steel high-pressure charge vessel with an additional 20 cc of n-heptane. Next, 5 cc of the triethyl aluminum solution were charged to the polymerization reactor through the small port. The stainless-steel high-pressure charge vessel then was installed into the small port sealing the polymerization reactor. The reactor was filled ⅔ full with liquid propylene, followed by the addition of the contents of the high-pressure charge vessel. Hydrogen then was added to the reactor (25 delta psig from a 300 cc vessel at room temperature) to produce a reaction mixture. The temperature of the reaction mixture was raised to 70° C., and the polymerization reaction proceeded for one hour yielding 50.1 grams of polypropylene. This equates to an activity of 626 grams of polypropylene per gram of treated solid oxide compound #4 per hour, which is higher than the other controls, but still not acceptable for commercial propylene polymerization processes.

Inventive Example 9

First, the treated solid oxide compound was charged to the reactor. The reactor was filled ⅔ full with liquid propylene to produce the inventive catalyst precursor. The stainless-steel high-pressure charge vessel, which contained the organometal compound dissolved in 5.5 cc of the triethylaluminum solution, was installed, sealing the polymerization reactor. Then, the organometal compound dissolved in 5.5 cc of the triethylaluminum solution was added, followed by the addition of hydrogen (25 delta psig from a 300 cc vessel at room temperature) to produce a reaction mixture. The reactor temperature then was raised to 70° C., and the polymerization reaction proceeded for one hour yielding 156.4 grams of polypropylene. This equates to an activity of 1838 grams of polypropylene per gram of treated solid oxide compound #4 per hour, which is much higher than the activity found in the control examples. This inventive process of contacting the treated solid oxide compound and propylene to produce the catalyst precursor yielded a much higher activity than that observed in the control examples.

Inventive Example 10

First, the solid organometal compound was charged to the reactor, followed by the addition of treated solid oxide compound #4. The stainless-steel high-pressure charge vessel, which contained 5.5 cc of the triethylaluminum solution, then was installed sealing the polymerization reactor. After the organometal compound and the treated solid oxide compound #4 were charged to the reactor, propylene was added to fill the reactor ⅔ full. Then, the 5.5 cc of the triethylaluminum solution were added, followed by the addition of hydrogen (25 delta psi from a 300 cc vessel at room temperature) to produce a reaction mixture. The reactor temperature then was raised to 70° C., and the polymerization reaction proceeded for one hour yielding 132.4 grams of polypropylene. This equates to a catalyst activity of 1691 grams of polypropylene per gram of treated solid oxide compound #4 per hour. This inventive method of addition of the catalyst. components also yields a higher activity than observed in the control examples.

Inventive Example 11

The same procedures as used in Inventive Example 10 were used in this example, except that only one tenth the amount of organoaluminum compound was used. Instead of 5 mL, 0.5 mL of triethylaluminum was added. 9.3 grams of polypropylene were produced which resulted in an activity of 121 grams of polypropylene per gram of treated solid oxide compound #4 per hour. Thus, although the procedure of contacting was correct, the amount of organoaluminum compound added was insufficient to achieve the maximum activity.

Inventive Example 12

First, the solid organometal compound was charged to the reactor, then treated solid oxide compound #4 was added, followed by the addition of the triethylaluminum solution. The reactor then was sealed and filled ⅔ full with liquid propylene, and the reactor temperature raised to 70° C. The polymerization reaction proceeded for one hour yielding 80 grams of polypropylene. This inventive method of contacting the catalyst components resulted in a high activity of 1166 grams of polypropylene per gram of treated solid oxide compound #4 per hour.

Inventive Example 13

The same procedure was utilized as in Inventive Example 12 except hydrogen was added to the reactor (25 delta psi from a 300 cc vessel at room temperature). 73 grams of polypropylene were produced which yielded an activity of 3582 grams of polypropylene per gram of treated solid oxide compound per hour.

Summary of different modes of combining the catalyst components:

Examples 1–13 demonstrate that it is possible to obtain a wide range of activities from exactly the same catalyst components, depending on how they are combined. The stage at which propylene or any alpha olefin is introduced was found to be particularly important. It is most critical that the propylene be added early in the combination process, preferably before all the other catalyst components are contacted, or at least simultaneously as the other components are contacted. These 13 runs can be classified into four main contacting approaches, or cases, as follows:

Case 1) Example 1 illustrates the worst possible method of combining the catalyst components because propylene was added only after the organometal compound, TEA, and treated solid oxide compound had already been precontacted for about half an hour. Example 5 might also be considered as an example of this approach because again propylene was added only after all the other catalyst components had been contacted.

Case 2) Examples 2 and 3 represent an intermediate case in which two of the ingredients were premixed, then exposed to propylene. The treated solid oxide compound and TEA were precontacted for about half an hour before contact with the organometal compound and propylene. Activity was only marginally better than Case 1.

Case 3) Examples 4 through 8 illustrate another intermediate case in which two of the catalyst components were premixed and then exposed to propylene. In this case, the treated solid oxide compound was first precontacted with the organometal compound for at least half an hour. The color change to purple indicated that a reaction had occurred. Eventually, the other catalyst components were also added in various ways. This method of contact represents an improvement over Case 2, but it still does not achieve the maximum activity potential. In these runs, propylene in vapor or liquid form was added at varying stages to the premixed purple material with varying results. The worst method was example 5 where TEA was clearly added to the purple material before the propylene liquid. The best method was example 8 where propylene liquid was clearly added before the TEA. Again this indicates the importance of adding the propylene early in the process.

Case 4) Finally, examples 9 through 13 represent the best method of contacting because the propylene was added first, or at least simultaneously with all the other catalyst components. These runs produced the highest activities. Example 11 is low because only ⅒ of the usual amount of TEA was added.

Inventive Examples 14–36

Runs 14 through 36 were made using the inventive process of contacting the catalyst components of this invention to illustrate other important aspects of this technology. The polymerization procedure described in inventive examples 12 and 13 was utilized.

Inventive Examples 14–24 demonstrate the inventive method of contacting the catalyst components of this invention with organometal compounds other than that used in examples 1–13. The procedure used for contacting the catalyst components was that used in examples 10–13. Treated solid oxide compounds #3, #4, and #5 (chlorided, zinc-containing aluminas) were utilized in these examples. The data are shown in Table 2. Activities of 85 to 1728 grams of polypropylene per gram of treated solid oxide compound per hour were observed. These examples demonstrate that polypropylene resins of high isotacticity can be prepared from this catalyst system, which contains no aluminoxane. Bulk densities were quite high, which is required for commercial operations, and no fouling was observed. Rac-1,2-ethanediylbis(2-methyl-1-indenyl)zirconium dichloride (Metallocene D) provided the highest activities in this series.

Inventive Examples 25–30 demonstrate the inventive method of contacting the catalyst components of this invention except that a different treated solid oxide compound was used. Instead of the chlorided zinc- containing aluminas of the previous runs, treated solid oxide compound #8 and #9 were used, which were aluminas which had been sequentially fluorided then chlorided. The data are shown in Table 2. Although these treated solid oxide compounds also provide activity, the activity is less than that provided by the chlorided zinc-containing alumina.

Inventive examples (31–36) demonstrate the inventive method of contacting the catalyst components of this invention using different organoaluminum compounds. The data are shown in Table 2. Activities varied from 343 to 3853 grams of polypropylene per gram of treated solid oxide compound #7 per hour. Using tri-isobutyl aluminum as the organoaluminum compound produced the highest activity when using organometal compound C.

In all inventive runs, the reactor was clean with no indication of any wall scale, coating or other forms of fouling.

Control Examples 37–42

Control Examples 37–42 demonstrate that the inventive method of contacting the catalyst components of this invention does not result in an active polymerization catalyst if the solid oxide compound is not treated with an electron-withdrawing anion source compound or metal salt compound.

Polymerizations were conducted as described previously. First, approximately 0.01 gram of the organometal compound was added to the reactor. Then, approximately 0.05 gram of calcined alumina (solid oxide compound #1), or calcined zinc-containing alumina (treated solid oxide compound #2) was added, followed by the addition of 5 milliliters of 15 weight percent triethylaluminum solution in heptane. The reactor then was sealed and filled ⅔ full with liquid propylene at room temperature to produce a reaction mixture. The polymerization temperature was raised to 70° C. and held for one hour. After this time, the reactor was depressurized and opened. In the examples where calcined alumina was used, small amounts of polypropylene were produced. When the zinc-containing alumina was used, only catalyst residues were recovered. These results are shown in Table 3.

Control Examples 43–50

Control Examples 43–50 demonstrate that the inventive method of contacting the catalyst components of this invention does not even result in small amounts of polymer if an organoaluminum compound is not present in the reactor when using an alumina or zinc-containing alumina as an activator for the organometal compound.

Polymerizations were run as described in the polymerization procedure discussed previously in examples 10–13. First, approximately 0.01 gram of an organometal compound was added to the reactor. Then, approximately 0.05 gram of solid oxide compound #1 (calcined alumina) or treated solid oxide compound #2 (calcined zinc-containing alumina) was added. The reactor then was sealed and filled ⅔ full with liquid propylene at room temperature. The polymerization temperature was raised to 70° C. and held for one hour. After this time, the reactor was depressurized and opened. Only catalyst residues were recovered. These results are shown in Table 3.

Control Examples 51 and 52

These examples demonstrate that even when the chlorided, zinc-containing alumina is used with the inventive method of contacting the catalyst components of this invention, no polymer results if an organoaluminum compound is not present in the reactor.

Polymerizations were run as described earlier in examples 10–13 using the procedures of this invention. First, approximately 0.01 gram of organometal compound was added to the reactor. Then, approximately 0.05 gram of treated solid oxide compound #10 (chlorided, zinc-containing alumina) was added. However, no organoaluminum compound was added. The reactor then was sealed and filled ⅔ full with liquid propylene at room temperature. The polymerization temperature was raised to 70° C. and held for one hour. After this time, the reactor was depressurized and opened. Only catalyst residues were recovered. These results are shown in Table 3.

Control Examples 53–56

These examples demonstrate that contacting an organometal compound with an organoaluminum compound, provides little, if any, polymerization activity. Only catalyst residues were recovered as shown in Table 3.

Polymerizations were run as described earlier in examples 10–13 except that no treated solid oxide compound was added. First, approximately 0.01 gram of organometal compound was added to the reactor, followed by the addition of 5 milliliters of 15 weight percent triethylaluminum solution in heptane. The reactor was sealed and filled ⅔ full with liquid propylene at room temperature. The polymerization temperature was raised to 70° C. and held for one hour. After this time, the reactor was depressurized and opened. Only catalyst residues were recovered. These results are shown in Table-III.

TABLE I

| Example | Organometal Compound[1] (g) | Treated Solid Oxide[2] Compound (g) | TEA[3] (mL) | Hydrogen[4] | Polymer[5] (g) | Activity[6] (g/g)/hr |
|---|---|---|---|---|---|---|
| Control 1 | 0.0099 | 0.0780 | 5 | 25 | 0.5 | 6.4 |
| Control 2 | 0.0105 | 0.0760 | 5 | 0 | 0.5 | 6.6 |
| Control 3 | 0.0123 | 0.0680 | 5 | 25 | 1.55 | 22.8 |
| Control 4 | 0.0120 | 0.08609 | 5 | 25 | 40 | 465 |
| Control 5 | 0.0100 | 0.0900 | 5 | 25 | 1.9 | 21 |
| Control 6 | 0.0170 | 0.0980 | 5 | 25 | 14.2 | 145 |
| Control 7 | 0.0150 | 0.1100 | 5 | 25 | 60.8 | 553 |
| Control 8 | 0.0150 | 0.0800 | 5 | 25 | 50.1 | 626 |
| Inventive 9 | 0.0120 | 0.0851 | 5 | 25 | 156.4 | 1838 |
| Inventive 10 | 0.0106 | 0.0783 | 5 | 25 | 132.4 | 1691 |
| Inventive 11 | 0.0109 | 0.0770 | 0.5 | 25 | 9.3 | 121 |
| Inventive 12 | 0.0142 | 0.0686 | 5 | 0 | 80 | 1166 |
| Inventive 13 | 0.0117 | 0.0483 | 5 | 25 | 173 | 3582 |

[1] rac-dimethylsilylbis-(1-indenyl)zirconium dichloride;
[2] treated solid oxide compound #4 (chlorided, zinc-containing alumina);
[3] A 15 wt. % solution of triethylaluminum (TEA) in heptane;
[4] Delta psi from a 300 cc vessel at room temperature;
[5] Grams of polypropylene produced in one hour; and
[6] Activity - (grams of polymer per gram of treated solid oxide compound)/hr.

TABLE II

| EXAMPLE | Organometal Compound (1) | Amount of (1) (g) | Treated Solid Oxide Compound (2) | Amount of (2) (g) | Organoaluminum Compound (3) | Milliliters of (4) | Hydrogen (5) | Polymer (6) (g) | Activity (7) (g/g)/hr | Fluff Bulk Density (8) (lb/cu. ft.) | Mw (g/mol) | HI (9) | Isotacticity (10) (mm) |
|---|---|---|---|---|---|---|---|---|---|---|---|---|---|
| 14 | A | 0.0098 | #5 | 0.3475 | TEA | 5 | 25 | 122 | 351 | 20.9 | 23.6 | 1.8 | 83.1 |
| 15 | B | 0.0914 | #5 | 0.3173 | TEA | 5 | 25 | 172 | 540 | 22.7 | 16.7 | 2.4 | 81.3 |
| 16 | B | 0.0076 | #5 | 0.3714 | TEA | 5 | 25 | 92 | 247 | 20.1 | 20.3 | 2 | 82.3 |
| 17 | C | 0.0074 | #3 | 0.7069 | TEA | 5 | 25 | 60 | 85 | 13.1 | 60.7 | 2.2 | |
| 18 | D | 0.0105 | #6 | 0.4441 | TEA | 5 | 25 | 213 | 480 | 22.8 | 44.5 | 2 | |
| 19 | D | 0.0123 | #6 | 0.042 | TEA | 5 | 25 | 72.6 | 1728 | 25.5 | 26.5 | 1.9 | |
| 20 | A | 0.0142 | #5 | 0.3479 | TEA | 5 | 0 | 68.7 | 197 | 21.4 | 20.8 | 1.9 | 84.1 |
| 21 | B | 0.0119 | #5 | 0.3432 | TEA | 5 | 0 | 106 | 310 | 20.9 | 18.9 | 1.7 | 82.9 |
| 22 | D | 0.0090 | #6 | 0.0487 | TEA | 2 | 0 | 58.3 | 1198 | 25.2 | 59.1 | 2 | 83.2 |
| 23 | D | 0.0095 | #6 | 0.0516 | TEA | 3 | 0 | 43.8 | 849 | 24 | 48.5 | 2.1 | 84 |
| 24 | D | 0.0088 | #6 | 0.047 | TEA | 5 | 0 | 35.1 | 747 | 21.9 | 45.5 | 1.8 | 83.2 |
| 25 | A | 0.0066 | #8 | 0.7571 | TEA | 5 | 25 | 176 | 232 | 21.7 | 11.6 | 1.7 | |
| 26 | B | 0.0087 | #8 | 0.7416 | TEA | 5 | 25 | 152 | 205 | 23.4 | 9.4 | 2 | |
| 27 | C | 0.0051 | #8 | 0.5667 | TEA | 5 | 25 | 33 | 58 | 21.7 | 23.3 | 2.1 | |
| 28 | C | 0.0114 | #9 | 0.3116 | TEA | 5 | 25 | 83.5 | 268 | 23.1 | 71.9 | 2.1 | 89.4 |
| 29 | A | 0.0107 | #9 | 0.3404 | TEA | 5 | 0 | 110 | 323 | 22.8 | 15.6 | 1.7 | 84 |
| 30 | B | 0.0142 | #9 | 0.3479 | TEA | 5 | 0 | 96.7 | 278 | 23.5 | 12.9 | 1.8 | 83.8 |
| 31 | C | 0.0115 | #7 | 0.0505 | TNPAL | 5 | 0 | 17.3 | 343 | | 153 | 2.3 | |
| 32 | C | 0.0091 | #7 | 0.0511 | TNBAL | 5 | 0 | 40.2 | 787 | 25.3 | 138 | 2.7 | |
| 33 | C | 0.0142 | #7 | 0.0607 | TIBA | 5 | 0 | 234 | 3853 | 22.8 | 134 | 2.8 | 91.2 |
| 34 | C | 0.013 | #7 | 0.051 | DIBAL-H | 5 | 0 | 38 | 745 | 24.3 | 162 | 2.5 | |
| 35 | C | 0.0096 | #7 | 0.0502 | TNHAL | 5 | 0 | 25.3 | 504 | 23.4 | 142 | 3.1 | |
| 36 | C | 0.0112 | #7 | 0.0511 | TNOAL | 5 | 0 | 20 | 391 | 20.8 | 144 | 3.3 | |

(1) Organometal A is rac-dimethylsilylbis(1-indenyl)zirconium dichloride, B is rac-1,2-ethanediylbis(1-indenyl)zirconium dichloride, C is rac-dimethylsilylbis(2-methyl-1-indenyl)zirconium dichloride, D is rac-1,2-ethanediylbis(2-methyl-1-indenyl)zirconium dichloride.
(2) Treated Solid Oxide Compounds #3, #5, #6, and #7 were chlorided, zinc-containing aluminas; Treated Solid Oxide Compounds #8 and #9 were chlorided and fluorided aluminas;
(3) Organoaluminum compounds used were TEA (triethylaluminum), TNPAL (tri-n-propylaluminum), TNBAL (tri-n-butylaluminum), TIBAL (tri-isobutylaluminum), DIBAL-H (di-isobutylaluminum hydride), TNHAL (tri-n-hexylaluminum), and TNOAL (tri-n-octylaluminum);
(4) Milliliters of organoaluminum solution (15 wt. percent in heptane) added to the polymerization reactor;
(5) Delta psi of hydrogen added to the polymerization reactor from a 300 cc vessel at room temperature;
(6) Total grams of dry solid polymer recovered from the polymerization reactor;
(7) Activity - (grams of polymer/gram of treated solid oxide compound) per hour;
(8) Bulk density of the solid particles formed in the polymerization reactor expressed in pounds per cubic foot.
(9) Molecular weights were determined by gel permeation chromatography (size exclusion chromatography); and
(10) Polymer isotacticity was determined by $C_{13}$ NMR.

TABLE III

| Example | Organometal Compound (1) | Grams of Organometal Compound | Treated Solid Oxide Compound (2) | Grams of Treated Solid Oxide Compound | Organo-Aluminum Compound | Polymer (3) |
| --- | --- | --- | --- | --- | --- | --- |
| 37 | A | 0.01 | #1 | 0.1003 | TEA | 0.3 |
| 38 | B | 0.0119 | #1 | 0.0918 | TEA | 0.26 |
| 39 | C | 0.0088 | #1 | 0.0924 | TEA | 0.47 |
| 40 | D | 0.0106 | #1 | 0.0982 | TEA | 0.44 |
| 41 | A | 0.0112 | #2 | 0.1012 | TEA | 0 |
| 42 | B | 0.0103 | #2 | 0.0995 | TEA | 0 |
| 43 | A | 0.0087 | #1 | 0.0936 | None | 0 |
| 44 | B | 0.0107 | #1 | 0.0932 | None | 0 |
| 45 | C | 0.0085 | #1 | 0.0963 | None | 0 |
| 46 | D | 0.0129 | #1 | 0.0933 | None | 0 |
| 47 | A | 0.0119 | #2 | 0.1057 | None | 0 |
| 48 | B | 0.0094 | #2 | 0.104 | None | 0 |
| 49 | C | 0.0098 | #2 | 0.099 | None | 0 |
| 50 | D | 0.0124 | #2 | 0.1033 | None | 0 |
| 51 | A | 0.0106 | #10 | 0.1003 | None | 0 |
| 52 | C | 0.0103 | #10 | 0.1053 | None | 0 |
| 53 | A | 0.0136 | None | | TEA | 0.23 |
| 54 | B | 0.0142 | None | | TEA | 0.06 |
| 55 | C | 0.0094 | None | | TEA | 0.1 |
| 56 | D | 0.0126 | None | | TEA | 0.15 |

(1) Organometal Compound A is rac-dimethylsilylbis(1-indenyl)zirconium dichloride, B is rac-1,2-ethanediylbis(1-indenyl)zirconium dichloride, C is rac-dimethylsilylbis(2-methyl-1-indenyl)zirconium dichloride, D is rac-1,2-ethanediylbis(2-methyl-1-indenyl)zirconium dichloride;
(2) Treated solid oxide compound #1 was calcined alumina; treated solid oxide compound #2 was calcined zinc-containing alumina; and treated solid oxide compound #10 was chlorided, zinc-containing alumina; and
(3) Solid polymer recovered from the polymerization reactor after the reaction had been terminated.

While this invention has been described in detail for the purpose of illustration, it is not intended to be limited thereby but is intended to cover all changes and modifications within the spirit and scope thereof.

That which is claimed is:

1. A process for producing a catalyst precursor, said process consisting essentially of contacting at least one treated solid oxide compound and at least one alpha olefin; wherein said treated solid oxide compound is produced by a process comprising: a) contacting at least one solid oxide compound with at least one electron-withdrawing anion source compound; and b) calcining said solid oxide compound before, during, or after contacting said electron-withdrawing anion source compound to produce said treated solid oxide compound.

2. A process according to claim 1 further comprising contacting said solid oxide compound with at least one metal salt compound.

3. A process according to claim 2 wherein said metal in said metal salt compound is selected from the group consisting of Groups IIA–VIIIA, IB–VIB of the Periodic Table of Elements including lanthanides and actinides.

4. A process according to claim 3 wherein said at least one metal is selected from the group consisting of Al, B, Be, Bi, Cd, Co, Cr, Cu, Fe, Ga, La, Mn, Mo, Ni, Sb, Si, Sn, Sr, Th, Ti, V, W, P, Y, Zn and Zr.

5. A process according to claim 4 wherein said solid oxide compound is selected from the group consisting of $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and mixtures thereof.

6. A process for producing a catalyst precursor, said process consisting essentially of contacting a chlorided, zinc-containing alumina and propylene.

7. A catalyst precursor produced by claim 1.

8. A catalyst precursor produced by claim 6.

9. A catalyst precursor consisting essentially of at least one treated solid oxide compound and at least one alpha olefin; wherein said treated solid oxide compound is produced by a process comprising: a) contacting at least one solid oxide compound with at least one electron-withdrawing anion source compound; b) optionally, also contacting said solid oxide compound with at least one metal salt compound; and c) calcining said solid oxide compound before, during, or after contacting said electron-withdrawing anion source compound or said metal salt compound to produce said treated solid oxide compound.

10. A catalyst precursor consisting essentially of a chlorided, zinc-containing alumina and propylene.

* * * * *